United States Patent
Yu

(10) Patent No.: US 8,523,431 B2
(45) Date of Patent: Sep. 3, 2013

(54) THERMOMETER WITHOUT POWER SWITCH

(75) Inventor: Chu-Yih Yu, Taipei Hsien (TW)

(73) Assignee: Mesure Technology Co., Ltd., San Chung, Taipei Hsien (TW)

( * ) Notice: Subject to any disclaimer, the term of this patent is extended or adjusted under 35 U.S.C. 154(b) by 268 days.

(21) Appl. No.: 12/891,057

(22) Filed: Sep. 27, 2010

(65) Prior Publication Data

US 2011/0222580 A1   Sep. 15, 2011

(30) Foreign Application Priority Data

Mar. 9, 2010   (TW) .............................. 99204189 U

(51) Int. Cl.
*G01K 1/00*   (2006.01)

(52) U.S. Cl.
USPC ......................................... 374/208; 374/184

(58) Field of Classification Search
USPC ................................ 374/208, 184
See application file for complete search history.

(56) References Cited

U.S. PATENT DOCUMENTS

| | | | | |
|---|---|---|---|---|
| 4,068,526 A | * | 1/1978 | Goldstein | 374/169 |
| 4,206,649 A | * | 6/1980 | Nagaie | 374/183 |
| 4,370,070 A | * | 1/1983 | Leroux | 374/170 |
| 2011/0194585 A1 | * | 8/2011 | Shrivastava | 374/120 |
| 2011/0222578 A1 | * | 9/2011 | Yu | 374/152 |
| 2011/0222579 A1 | * | 9/2011 | Yu | 374/152 |
| 2011/0224941 A1 | * | 9/2011 | Yu | 702/130 |

FOREIGN PATENT DOCUMENTS

| | | | |
|---|---|---|---|
| FR | 2886399 A1 | * | 12/2006 |
| JP | 61070430 A | * | 4/1986 |
| JP | 04315931 A | * | 11/1992 |

* cited by examiner

*Primary Examiner* — Mirellys Jagan
(74) *Attorney, Agent, or Firm* — McClure, Qualey & Rodack, LLP

(57) ABSTRACT

A thermometer is constituted by a body member and a tip member secured to the body member. A thermal sensor is mounted on the inside of the tip member, adapted for sensing a temperature and producing a temperature signal. A set of leas wires is coupled to the thermal sensor for transmission of the temperature signal. A display unit is disposed on the body member and a processor is disposed to electrically connect the set of lead wires to receive the temperature signal and drive the display unit for display of a corresponding temperature reading. A rear cover is secured to the body member. A mechanical selector is disposed between the processor and the rear cover and the type of temperature scale displayed in the display unit is selected by pushing the mechanical selector from the rear cover.

13 Claims, 5 Drawing Sheets

THERMOMETER WITHOUT POWER SWITCH

BACKGROUND OF THE INVENTION

1. Field of the Invention

The invention relates to the field of thermometers, and more particularly to the field of thermometers with mechanical selector for types of temperature scale conversion.

2. Description of the Related Art

Electronic thermometers generally offer a great number of advantages over conventional glass and mercury thermometers for use in the health care field. Among the advantages of electronic thermometers are the elimination of sterilization procedures for glass thermometers, made possible by the use of disposable covers; elimination of the possibility of broken glass if a thermometer is dropped; a digital temperature display to eliminate temperature reading errors; and with proper circuit design and calibration, higher accuracy and resolution is possible with accurate measurement and display of tenths of a degree Fahrenheit being easily attainable.

Such electronic thermometers typically use a chemical battery as a power supply. However, the electronic thermometers are generally idle for a long time since patients only use the electronic thermometers while they are sick or feel uncomfortable. Thus such electronic thermometers employing a chemical battery as a power supply are not environmentally friendly.

The present inventor proposed to employ a thermometer without battery and switch button to solve this problem in U.S. patent application Ser. No. 12/819,586. However, The type(s) of temperature scale, such as Fahrenheit scale or Celsius scale displayed, may be predetermined by the designer, or it may be selected by the user. Thus, there is a need to provide a new design of thermometer with a mechanical selector for types of temperature scale conversion.

SUMMARY OF THE INVENTION

An exemplary embodiment of the present invention overcomes the above-described problems by providing a thermometer comprising a body member and a tip member secured to the body member. A thermal sensor is mounted on the inside of the tip member, adapted for sensing a temperature and producing a temperature signal. A set of leas wires is coupled to the thermal sensor for transmission of the temperature signal. A display unit is disposed on the body member and a processor is disposed to electrically connect the set of lead wires to receive the temperature signal and drive the display unit for display of a corresponding temperature reading. A rear cover is secured to the body member. A mechanical selector is disposed between the processor and the rear cover and the type of temperature scale displayed in the display unit is selected by pushing the mechanical selector from the rear cover.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
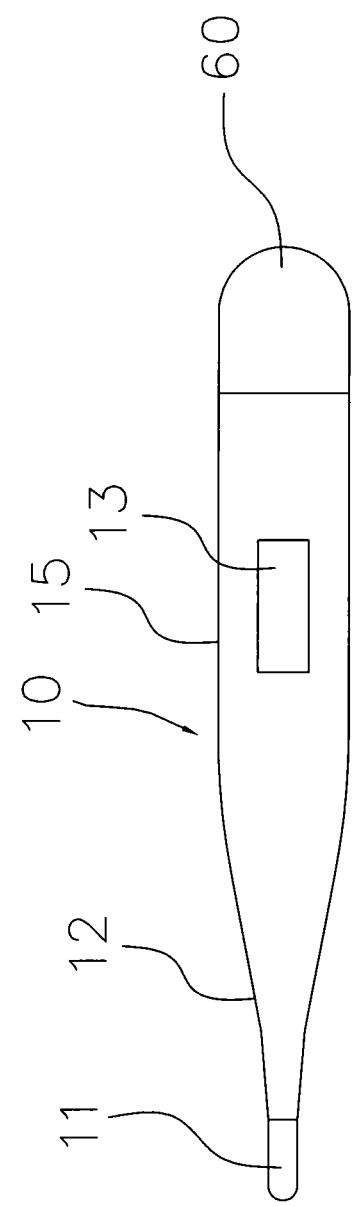
FIG. 1 is a schematic view of a thermometer without power switch according to an exemplary embodiment of the invention.
Figure 2:
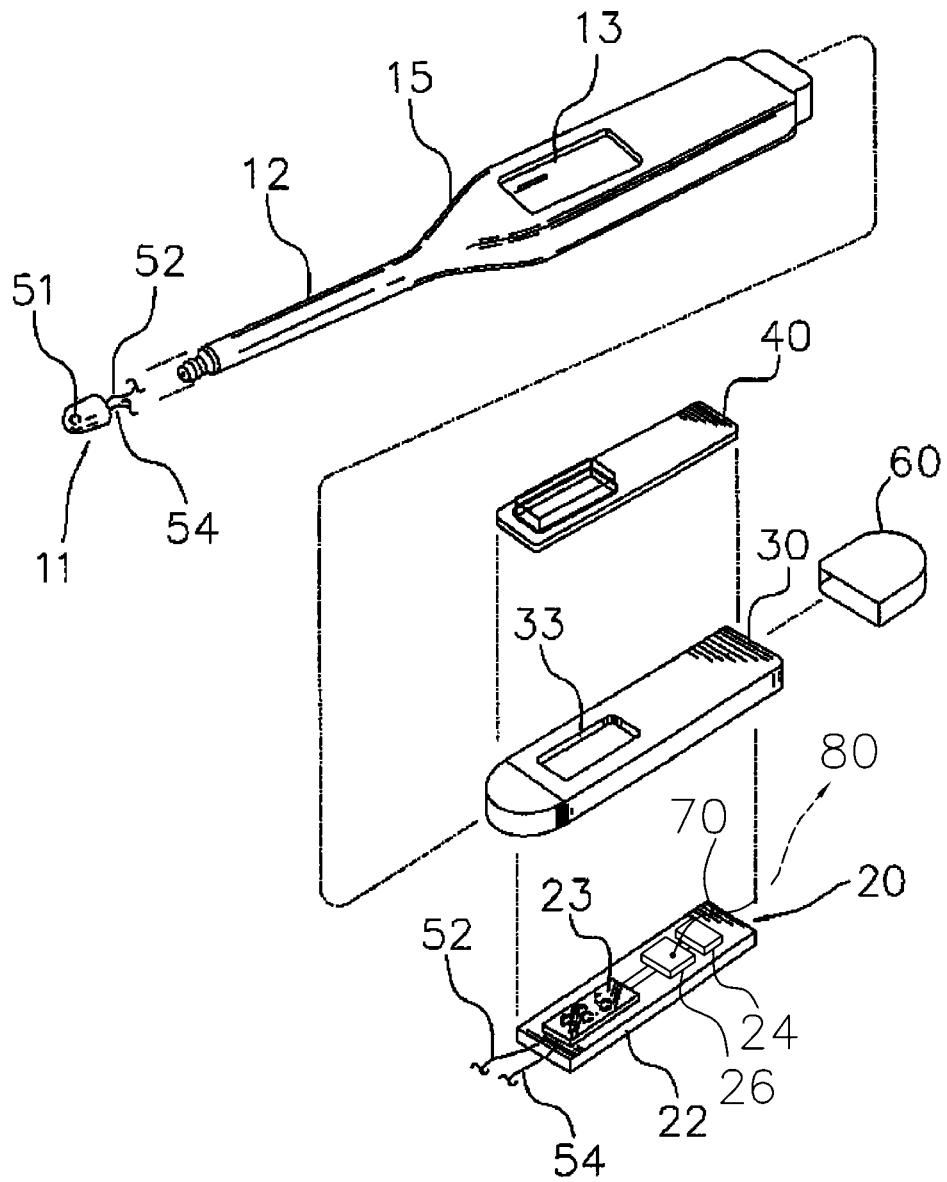
FIG. 2 is an exploded perspective view of a motion powered thermometer according to an exemplary embodiment of the invention.

Referring to FIGS. 1 and 2, an embodiment of a thermometer is illustrated. The thermometer is made up of a body member 10 and a tip member 11. Typically, a cover 60 is secured to the body member 10 after components of the thermometer have been assembled. The body member 10 includes a probe portion 12 and a display portion 15. The tip member 11 is secured to a frond end, such as the probe portion 12 of the body member 10. Preferably, it contains a thermal contact surface surrounding a hollow cavity. In one embodiment, the hollow tip member 11 is preferably made of metal with good thermal conductivity, such as stainless steel.

A thermal sensor 51 is placed at the end of the tip member 11 and mounted on the inside of the thermal contact surface. The thermal sensor senses the temperature of the thermal contact surface and produces a temperature signal. There are a set of lead wires 52, 54 coupled to the thermal sensor 51 for transmission of the temperature signal.

As shown in FIG. 2, a display unit 20 is disposed in the display portion 15 and connected to the lead wires 52, 54 to receive the temperature signal for display of a corresponding temperature reading. Typically, a base plate 30 may be adapted for supporting the display unit 20. In one example, the display unit 20 may comprise a substrate 22; a display 23, such as LCD panel, disposed thereon; and a processor 24 such as integrated circuit chip disposed thereon, coupled to the display 23. Processor 24 is electrically connected to the lead wires 52, 54 to receive the temperature signal; it drives the display 23 to show a corresponding temperature reading. Preferably, the base plate 30 has an opening 33 to expose the display 23. Typically, the base plate 30 is plastic and the substrate 22 is PCB board.

In one example, the tip member 11 is made in the form of a tubular shape and closed at a domed, hemispherical or hemiellipsoid shaped end. The contact surface is brought in contact with flesh of a patient so that heat can be transferred from the patient's flesh to the tip member 11. In one embodiment, the thermal sensor 51 is thermistor. The lead wires 52, 54 and the thermistor 51 are both adhered on the inside of the thermal contact surface with heat conductive glue. The glue is an insulating material with good thermal conductivity, e.g., epoxy resin. Moreover, the lead wires 52, 54 are made up of a pair of electrical lead wires; they are used to connect the thermal sensor 51 to the processor 24 for determining a corresponding temperature to display.

A transparent layer 40 extending from an upper surface thereof at least covers the display unit 20 under the display aperture 13. Preferably, the transparent layer 40 covers an entire upper surface of the base plate 30. And generally, the display 23 is disposed on the substrate 22 and under the transparent layer 40. The transparent layer 40 may be a transparent plastic sheet. Preferably, the transparent layer is made of organic glass or polymethyl methacrylate (PMMA).

Figure 3:
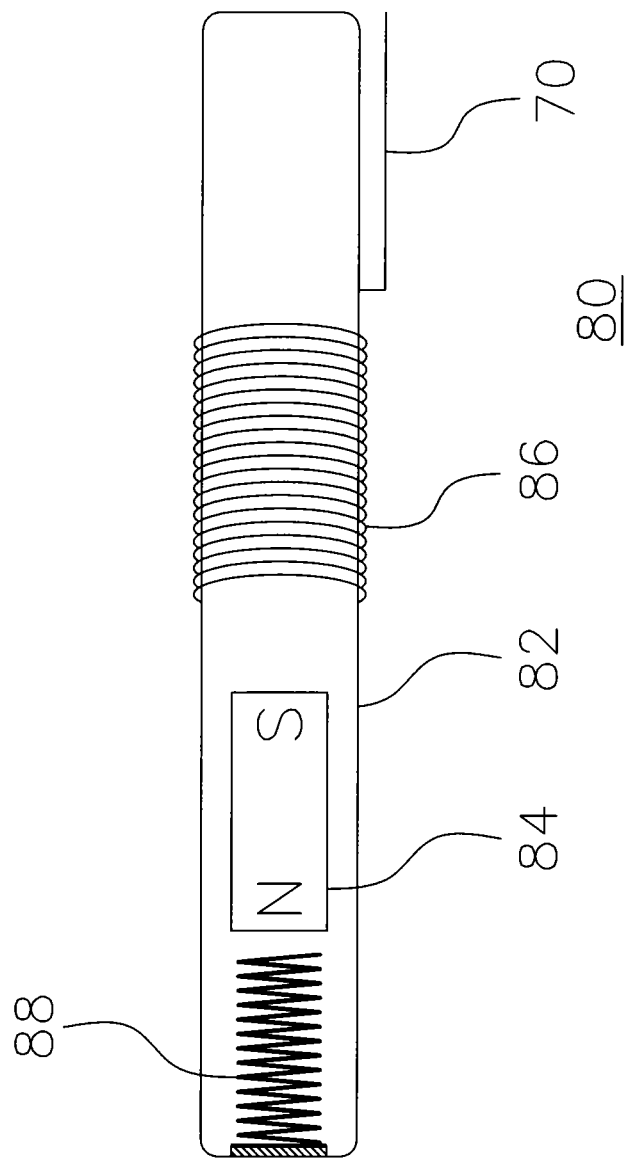
FIG. 3 is a schematic view of a motion electric power generator according to an exemplary embodiment of the invention.

Referring to FIG. 3, a motion electric power generator is disposed in the body member 10, in one example, adjacent to display unit 20. Motion electric power generator comprises a tubular cylinder 82 disposed in the body member and a magnetic core 84 being free to slide within the tubular cylinder 82. A coil of wire 86 is wrapped around the tubular cylinder 82 so that the magnetic core 84 moves through the coil of wire 86 when sliding through the tubular cylinder 82 from one end to an opposite end. As shown in FIG. 2, a capacitor 26 such as chip capacitor is electrically connected to the coil of wire 86 through the electricity transmission wires 70. As magnetic core 84 moves through tubular cylinder 82, it will change the magnet flux flowing through the coil of wire 86, increasing the capacitor voltage.

Further, processor 24 is electrically connected to the capacitor 26 to obtain electric power and is electrically connected to the set of lead wires 52, 54 to receive the temperature signal and drive the display unit for display of a corresponding temperature reading. In one example, capacitor 26 stores electrical energy by continuously moving the thermometer back and forth. Processor 24 is actuated to drive the display 23 to display a starting signal showing the thermometer is performing a charging action or transmit the starting signal to a speaker (not shown) to generate voice to inform the user the thermometer is performing a charging action, while the capacitor voltage is equal to or higher than a predetermined start voltage. And then the processor 24 is detecting a change of the capacitor voltage. During a short motion time, processor 24 starts it's body temperature measuring operation and drive the display 23 to display an operation signal showing the thermometer is performing a body temperature measuring operation or transmit the operation signal to a speaker (not shown) to generate voice to inform the user the thermometer is performing a body temperature measuring operation, while the capacitor voltage is further increased to a predetermined operation voltage and which is enough to perform at least one or two cycles of body temperature measuring operation.

In such thermometers, capacitor stores energy for the processor to use on demand, so it can be used like a temporary battery to maintain power supply. Thus, there is no need to use a chemical battery which is easy to cause environmental pollution.

Furthermore, a helical spring 88 may be mounted on one end or both ends of the tubular cylinder 82 to increase the movement of the magnetic core 84.

In another embodiment, there is no need to create battery cover and/or power switch on the surface of the body potion of the thermometers since the thermometers are battery free, and thus such structure may enhance a water-tight seal function as shown in FIG. 1.

Figure 4:
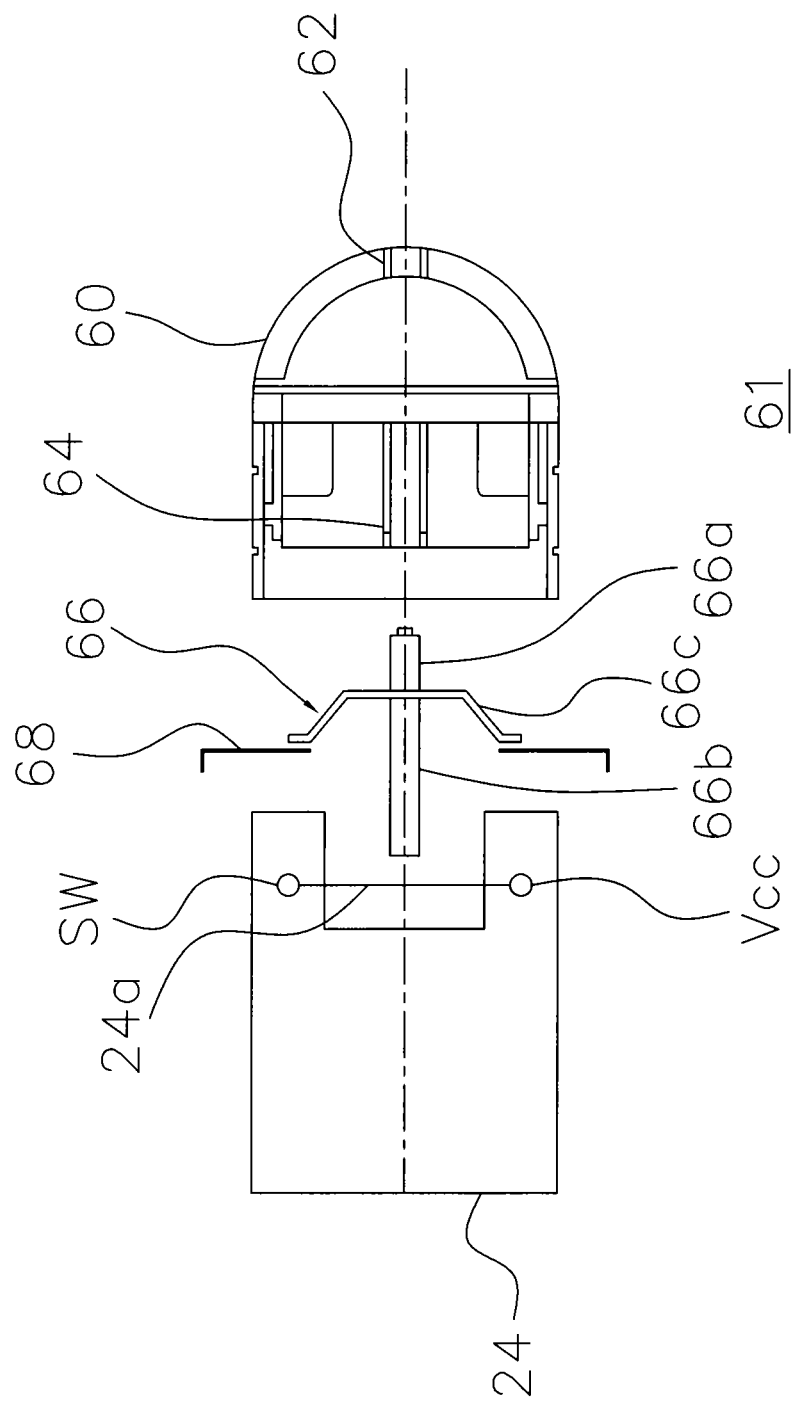
FIG. 4 is a cross-sectional side view of a mechanical selector for types of temperature scale conversion according to an exemplary embodiment.

Referring now to FIG. 4, there is shown a cross-sectional side view of the mechanical selector for types of temperature scale conversion according to an exemplary embodiment. In this embodiment, the processor 24 may also comprise a pin SW for types of temperature scale conversion. The mechanical selector 61 comprises a hole 62 which is located on a surface of the rear cover 60. A channel is disposed within the rear cover 60 and communicated with the hole 62. An elastic member 66 comprises an elastic main portion 66c, a front protrusion portion 66a and a rear protrusion portion 66b. For example, the front protrusion portion 66a is extended from the elastic main portion 66c toward the channel 64 and the second protrusion portion 66b is extended from the elastic main portion 66c toward the processor 24.

A connection line 24a is disposed to electrically connect the pin SW for keeping a voltage. The voltage of the pin SW may be changed to convert the types of temperature scale by pushing the front protrusion portion 66a from the hole 62 and the channel 64 within the rear cover 60 such that the rear protrusion portion 66b is moved to cut the connection line 24a. In one example, when the front protrusion portion 66c is subjected to a push force such as a use of a needle to insert into the hole, deformation of the elastic main portion 66c occurs. When the applied push force is removed, the deformation can be undone by a return force from the elastic main portion 66c. Thus, the elastic main portion 66c is recovered in an original form and the front protrusion portion 66a is moved back to seal the channel 64 after release of the force. The elastic main portion 66c may be secured to any position 68 within the body member 10, such as the substrate 22, the processor 24, the base plate 30 or the rear cover 60. The connection line 24a may also comprise an end which is disposed to electrically connect a power voltage Vcc.

Figure 5:
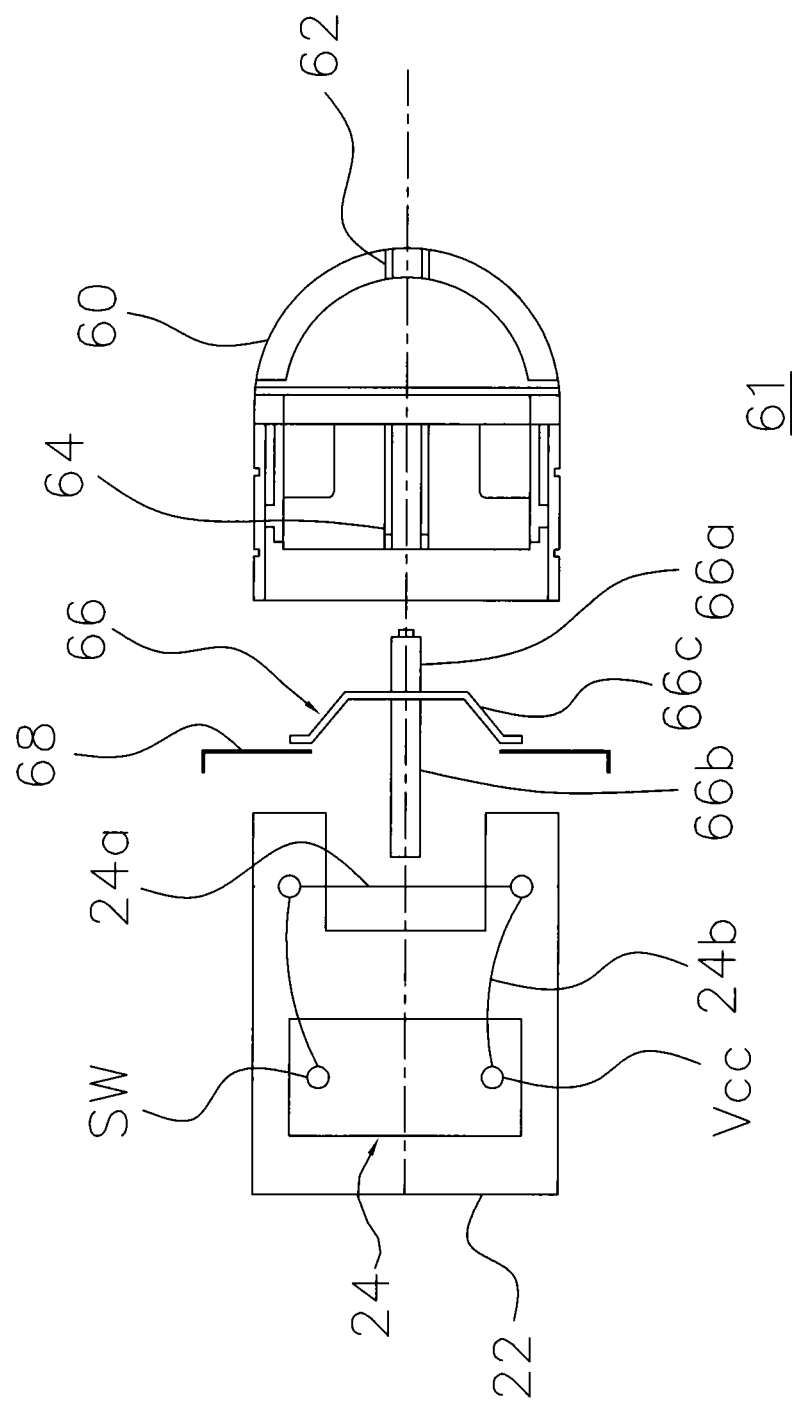
FIG. 5 is a cross-sectional side view of a mechanical selector for types of temperature scale conversion according to an exemplary embodiment.

FIG. 5 represents an exemplary embodiment of a cross-sectional side view of the mechanical selector for types of temperature scale conversion. In this example, the connection line 24a may also be secured to the substrate 22 to electrically connect the pin SW and a predetermined voltage such as the power voltage Vcc through the wires 24b. The substrate 22 may also comprise a recession portion for an easy to move the rear protrusion portion 66b.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A thermometer comprising:
a body member;
a tip member secured to the body member;
a thermal sensor mounted on the inside of the tip member, adapted for sensing a temperature and producing a temperature signal;
a set of lead wires, coupled to the thermal sensor for transmission of the temperature signal;
a display unit, disposed on the body member;
a processor, disposed to electrically connect the set of lead wires to receive the temperature signal and drive the display unit for display of a corresponding temperature reading;
a rear cover, secured to the body member; and
a mechanical selector, disposed between the processor and the rear cover, the types of temperature scale displayed in the display unit being selected by pushing the mechanical selector from the rear cover; wherein the processor comprises a pin for types of temperature scale conversion and the mechanical selector comprises:
a hole, formed located on a surface of the rear cover;
a channel, disposed within the rear cover and communicated with the hole;
an elastic member comprising a main portion, a first protrusion portion extended from the main portion toward the channel, a second protrusion portion extended from the main portion toward the processor; and
a connection line, disposed to electrically connect the pin for keeping a voltage, wherein the voltage of the pin is changed to convert the types of temperature scale by pushing the first protrusion portion from the hole and the channel within the rear cover such that the second protrusion portion is moved to cut the connection line.

2. The thermometer as recited in claim 1, wherein the main portion of the elastic member is secured to a position in the body member of the thermometer and deformation of the main portion of the elastic member occurs when the first protrusion portion is subjected to an applied force, and the deformation is undone by a return force from the main portion of the elastic member when the applied force is removed, and thereby the first protrusion portion is moved to seal the channel.

3. The thermometer as recited in claim 1, wherein the connection line comprises an end disposed to electrically connect a predetermined voltage.

4. The thermometer as recited in claim 1, further comprising a substrate for the processor disposed thereon, wherein the connection line is secured to the substrate.

5. The thermometer as recited in claim 4, wherein the main portion of the elastic member is secured to a position of the substrate, the base plate, the processor or the rear cover.

6. The thermometer as recited in claim 1 further comprising:
   a tubular cylinder, disposed in the body member;
   a magnetic core, being free to slide within the tubular cylinder;
   a coil of wire, wrapped around the tubular cylinder so that the magnetic core moves through the coil of wire when sliding through the tubular cylinder from one end to an opposite end; and
   a capacitor, electrically connected to the coil of wire and the processor electrically connected to the capacitor to obtain electric power.

7. The thermometer as recited in claim 6 further comprising a helical spring mounted on one end or both ends of the tubular cylinder.

8. The thermometer as recited in claim 6 further comprising a substrate and wherein the display unit, the processor and the capacitor are disposed on the substrate.

9. The thermometer as recited in claim 8 wherein the thermometer contains no chemical battery, power switch or switch button.

10. The thermometer as recited in claim 9 wherein the capacitor comprises a chip capacitor.

11. The thermometer as recited in claim 10, wherein the capacitor stores electrical energy, and the processor is actuated to detect a change of the capacitor voltage while a capacitor voltage is equal to or higher than a predetermined start voltage.

12. The thermometer as recited in claim 11, wherein the processor is actuated to drive the display unit to display a starting signal showing the thermometer is performing a charging action.

13. The thermometer as recited in claim 12, wherein the processor starts a body temperature measuring operation and drives the display unit to display an operation signal showing the thermometer is performing a body temperature measuring operation, while the capacitor voltage is further increased to an operation voltage which is enough to perform at least a cycle of the body temperature measuring operation.

* * * * *